US00H002176H

(19) United States

(12) Statutory Invention Registration

Meyer et al.

(10) Reg. No.: US H2176 H

(43) Published: Dec. 5, 2006

(54) SYSTEM FOR PROCESSING INTERIOR ENVIRONMENT COMPLAINTS FROM BUILDING OCCUPANTS

(75) Inventors: Sheri L Meyer, Wauwatosa, WI (US); Darrell E Standish, New Berlin, WI (US)

(73) Assignee: Johnson Controls Technology Company, Plymouth, MI (US)

(21) Appl. No.: 09/679,903

(22) Filed: Oct. 5, 2000

(51) Int. Cl.
*G05D 23/00* (2006.01)

(52) U.S. Cl. ..... 236/51

(58) Field of Classification Search ..... 236/51; 700/1; 709/246, 203, 316, 206; 705/26, 27; 715/520; 379/243

See application file for complete search history.

(56) References Cited

U.S. PATENT DOCUMENTS 5,579,384 A * 11/1996 Seymour ..... 379/243
5,734,903 A * 3/1998 Saulpaugh et al. ..... 709/316
5,762,265 A * 6/1998 Kitamura et al. ..... 236/51
5,867,651 A * 2/1999 Dan et al. ..... 709/203
5,918,214 A * 6/1999 Perkowski ..... 705/27
6,073,165 A * 6/2000 Narasimhan et al. ..... 709/206
6,145,751 A * 11/2000 Ahmed ..... 236/51
6,167,383 A * 12/2000 Henson ..... 705/26
6,453,327 B1 * 9/2002 Nielsen ..... 715/500
6,498,955 B1 * 12/2002 McCarthy et al. ..... 700/1

FOREIGN PATENT DOCUMENTS

JP 2000244492 A * 9/2000

OTHER PUBLICATIONS

McGregor, Wes; "The future of workspace management"; Facilities; Bradford: Mar./Apr. 2000; vol. 18, iss 3/4; p. 138; extracted internet on Sep. 30, 2003 from http://proques-t.umi.cpm.*

* cited by examiner

*Primary Examiner*—Daniel Pihulic

(74) *Attorney, Agent, or Firm*—Foley & Lardner LLP

(57) ABSTRACT

Occupants of a building are able to submit complaints regarding operating conditions, such as temperature, humidity and air quality, via a web site on an Intranet or Internet. The server for the web site logs the complaints and current environmental conditions in a storage device. The server also applies a filter criterion to each complaint and when the complaints satisfy the filter criterion a warning is sent to building management personnel. This filtering process enables the building management personnel to be alerted when the number of complaints exceeds a given number or when specific classes of occupants submit a complaint.

39 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTRACOMFORT WEB SITE

INTRACOMFORT WEB SITE

COMPLAINT AGENT

| COMPLAINT LOG | | | | | | | | |
|---|---|---|---|---|---|---|---|---|
| DATE & TIME | COMFORT AREA | COMPLAINT | OCCUPANT ID | AREA TEMP. | HUMIDITY | CO2 | SETPOINT | DISCHARGE TEMP. |
| 08/15/00 1:45 PM | FLOOR 4 WEST | HOT | BAKER, J. | 79.0 °F | 60% RH | 500 PPM | 76.0 °F | 60.0 °F |
| 08/15/00 1:40 PM | FLOOR 3 EAST | COOL | POND, J. | 68.2 °F | 62% RH | 461 PPM | 75.0 °F | 55.0 °F |
| 08/15/00 9:46 AM | FLOOR 1 LOBBY | HOT | THOMAS,K. | 80.6 °F | 60% RH | 450 PPM | 75.0 °F | 51.0 °F |
| 08/15/00 9:30 PM | FLOOR 3 EAST | HUMID | RADLER, D. | 73.9 °F | 76% RH | 475 PPM | 74.0 °F | 54.0 °F |
| 08/14/00 4:46 PM | FLOOR 4 WEST | HOT | BAKER, J. | 78.8 °F | 57% RH | 488 PPM | 76.0 °F | 55.0 °F |
| 08/14/00 2:16 PM | FLOOR 2 NORTH | COOL | FOX, A. | 70.0 °F | 61% RH | 463 PPM | 76.0 °F | 55.0 °F |
| 08/14/00 9:23 PM | FLOOR 1 EAST | DRAFTY | SWIFT, C. | 72.9 °F | 56% RH | 495 PPM | 73.0 °F | 51.0 °F |

FIG. 8

SYSTEM FOR PROCESSING INTERIOR ENVIRONMENT COMPLAINTS FROM BUILDING OCCUPANTS

BACKGROUND OF THE INVENTION

The present invention relates to facility management systems, such as those which control the environment within a building, and more particularly to systems by which building occupants can register complaints regarding operation of such systems.

Modern office buildings provide a sealed interior environment in that the windows can not be opened to allow outside air into the interior space. As a consequence, the air quality within the building is controlled solely by the heating, ventilation and air conditioning (HVAC) system. Unlike residential HVAC systems, the controls in commercial building are not directly accessible by the occupants, but rather only by facility management personnel.

As a consequence, if an occupant is uncomfortable, i.e. too cold, too hot or the air is stale, the individual must contact the building management in order to have the environmental control changed. In many office buildings a complaint by an individual occupant has to be relayed through several individuals before reaching a building engineer who has the authority and capability to adjust the HVAC system. Thus, it may take some period of time for the message to reach the building engineer and there is a potential for miscommunication.

Furthermore in a very large building the central contact person in the building management can receive complaints on a continuous basis at certain times, such as when there is a sudden change in outdoor air temperature. At those times the contact person may be fully occupied with answering telephone complaint calls and unable to perform other duties.

SUMMARY OF THE INVENTION

The present invention provides a mechanism by which building occupants can submit facility complaints via an Intranet or Internet communication link. This system eliminates the need to have a person available at all times to receive the complaints. The complaint messages can be screened automatically and building management personnel alerted when certain conditions occur.

The occupant complaints are handled by an Intracomfort system that is connected to a communication network which is accessible by the building occupants. For example, the communication network may be the Internet or may be part of an Intranet in the building. A message processing system is coupled to the communication network to receive the complaint messages generated by building occupants. The message processing system stores information about each complaint and the stored information is accessible by building management personnel.

In the preferred embodiment, the message processing system contains a predefined message filtering criterion which is applied to received complaint messages. A warning is generated when the received complaint messages satisfy the message filtering criterion. The warning is sent to the building management personnel. For example, the message filtering criterion may specify a number of complaint messages that must be received from a given area of the building within a specified interval of time before a warning is generated. In other situations the filtering criterion specifies a class of building occupants and any message from an occupant in that class generates a warning.

A display device, such as a computer workstation for example, is coupled to the server for presenting the warning and other complaint information to management of the building.

BRIEF DESCRIPTION OF THE DRAWINGS

FIG. 8 represents a display of complaint information is a table.

DETAILED DESCRIPTION OF THE INVENTION

Personal comfort in any working environment is a key factor to productivity and quality work products. If employees are physically uncomfortable, they may become distracted by the discomfort, thus lowering their level of concentration. As a consequence, proper control of a workplace environment is very important.

Relatively large commercial buildings are divided into a plurality of control zones, referred to herein as "comfort areas", with independently controllable environmental conditions. For example, each control zone may have a separate variable air volume (VAV) unit that recycles the interior air and heats or cools that air as needed to maintain the desired environment. The VAV unit also can replace some of the recycled air with air drawn in from outside the building thus preventing the interior air from becoming stale. The operation of the VAV unit and other components of the HVAC system are individually controlled by the building management.

The present invention provides an "IntraComfort System" which enables occupants of a building to indicate their level of comfort in their work area by means of an Intranet browser based interface. This provides automated collection and generation of building area comfort information for use by the building operators and managers in improving occupant comfort. Through this system, building occupants become active "users" of their work environment. Furthermore, the performance of building control systems can be determined more accurately through actual user feedback, rather than solely through sensing environmental parameters. This expanded insight into occupant comfort diminishes complaint telephone calls, thereby reducing the amount of time a building operator spends handling comfort complaints.

Figure 1:
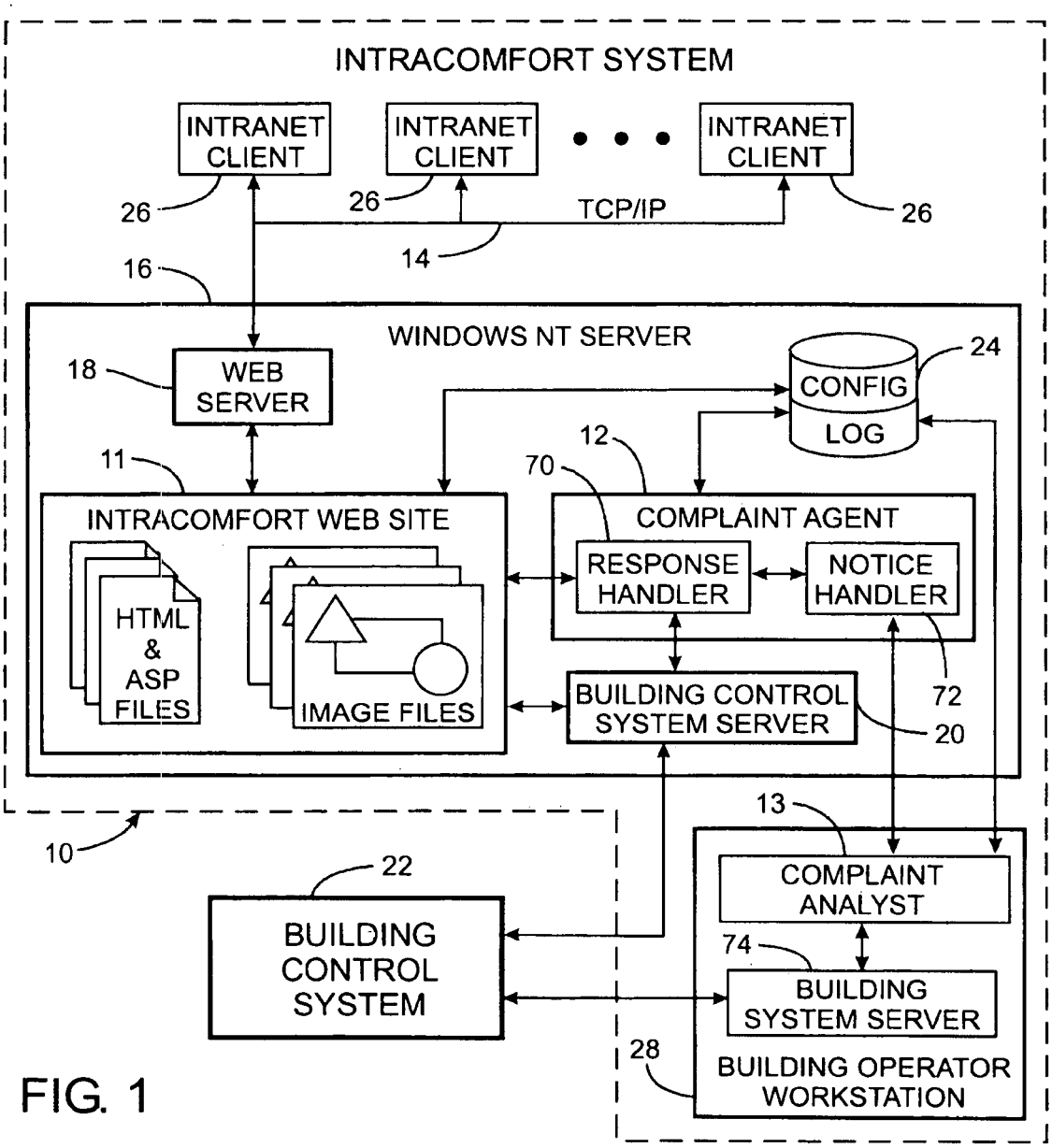
FIG. 1 is a block diagram illustrating the architecture of an IntraComfort system according to the present invention.

With reference to FIG. 1, the IntraComfort System 10 acts as a, Intranet/Internet web site on a computer network 14 and comprises three principal components, a IntraComfort Web site 11, a Complaint Agent 12, and a Compliant Analyst 13. The first two components reside on a Windows NT® based system server 16 connected to the computer network 14 via a Web server 18.

The IntraComfort Web site 11 is a conventional Intranet web site that is configured to enable building occupants to view information about present environmental conditions and enter complaints via personal computers 26, which execute a standard Internet browser thereby acting as an Intranet client. If a single tenant occupies the entire building, the IntraComfort System can be implemented as an Intranet site on that tenant's local area network 14. In multi-tenant buildings, the IntraComfort System 10 can utilize the Internet, in place of the computer network 14. Thus the terms Internet and Intranet are used interchangeably with respect to the present invention.

The IntraComfort Web site 11 comprises a combination of HTML, ASP, and image files which present information about the building environment and which provide templates for occupants to enter complaints and comments. The clients of the IntraComfort Web site, i.e. the building occupants, use dynamic HTML enabled Internet browsers running on their personal computers 26 to view the site content via an Intranet connection provided by the ASP enabled Web server 18. The access is similar to the operation of a standard Internet site. Complaints and comments received by the IntraComfort Web site 11 are passed to the Complaint Agent 12. The Complaint Agent 12 acts as a mediator between the IntraComfort Web site 11 (the building occupant interface) and the Complaint Analyst 13 (the building operator interface). The primary responsibilities of the Complaint Agent 12 are handling all incoming occupant submissions received via the IntraComfort Web site 11 and generating comfort notices based on those submissions. Secondary responsibilities of the Complaint Agent 12 relate to handling operator-authored notices about the system or a given comfort area for posting to the IntraComfort Web site.

The Complaint Agent 12 is divided into two communication interfaces, a Response Handler 70 and a Notice Handler 72. The Response handler 70 logs all occupant generated comfort complaints along with appropriate building control system environmental data. A storage device 24, such as a hard drive, is provided in the system server 16 to store the complaints and comments gathered from building occupants. The Response handler 70 also logs requests from occupants to be added to the IntraComfort system. This software component also processes requests from the building operator (via the Complaint Analyst 13) to post web page notices for a specific comfort area or the building in general.

Upon receiving a complaint the Response Handler also determines whether the nature of a complaint warrants sending a notice to the building operator, in which case the Notice Handler 72 is advised of that event. The conditions for generating a notice are defined in the system configuration file. For example if the number of complaints received within a defined period of time exceeds a given amount, a warning message is sent to the Complaint Analyst 13 running on a building operator's workstation 28, which typically is a personal computer with a keyboard and display screen. The Complaint Analyst 13 software component, which runs on that workstation 28, handles the notices and produces reports and statistical summaries of the complaints for review by the building management, as will be described. All information logged by the Response handler 70 is able to be accessed by the building operator through the Complaint Analyst 13. Each log entry contains the date and time that the notice threshold was reached, where the condition occurred (Comfort Area or system in general), and an identification of the condition.

The system server 16 also includes another communication server 20 which interfaces to a communication bus of the HVAC building control system 22, such as a Metasys® Building Automation System produced by Johnson Controls, Inc. of Milwaukee, Wis., U.S.A. The interface with the building control system 22 enables the Intracomfort system 10 to gather current values for temperature, humidity and other environmental parameters throughout the building.

As noted previously, the operation of the Intracomfort system 10 is defined by configuration data entered by the building operators via workstation 28. The configuration data fall into several categories, for example building comfort areas and occupant profile. Each category of configuration data is stored in a separate table in the storage device 24. The building comfort area data specify, for each comfort area, the particular environmental conditions on which the building occupants are able to provide feedback. These conditions include environmental parameters such as temperature, humidity, and air quality. When an occupant accesses the Intracomfort system, only the conditions designated in the configuration data of the comfort area associated with that occupant will be logged. However, the occupant always is able to submit a written comment. The comfort area configuration also designates what environmental information will be displayed to the building occupants. This information can include the current values for temperature and humidity of the inquiring occupant's working area, and outdoor temperature and humidity values.

The Intracomfort system 10 also can enable a building occupant to turn-on the automatically controlled lighting in the respective work area and this function is enabled or disabled by the system configuration. Upon entry, the configuration information is tabulated by the complaint analyst 13 and sent to the storage device 24.

The configuration database also contains a profile of information about each building occupant who may access the Intracomfort system 10. That profile contains a unique occupant identifier which each person utilizes when accessing the system and can be the full name of the individual, a network user name or another designation created by the building operator. Each occupant profile contains a designation of a comfort area within the building in which the person works. As noted previously, a comfort area corresponds to one of the zones in the building for which the environment can be separately controlled. For example depending on the HVAC system, the comfort area may be an entire floor of the building or a designated section of a floor.

A priority level may be assigned to each occupant with that assignment being stored in the person's profile. As will be described, the processing of complaints can be based on the priority level of the occupant submitting the complaint. With complaints from higher priority level individuals receiving greater attention.

If the building control system 22 is able to operate the lights in the given comfort area, the ability for occupants to control the lights through the IntraComfort system 10 also may be enabled in the configuration data. For this function a designation of the bank of lights for the occupant's work area is specified. Note that the lighting bank may not be coextensive with the comfort area. As will be described, the occupants may only turn on comfort area lighting, but cannot turn it off. Only the building control system 22 program can deactivate building lights.

The occupant profile also includes information such as persons's phone number, mailing address, or email address to enable the building management to contact that occupant. The workstation executes software, referred to herein as the Complaint Analyst, which displays the occupant profile on the screen of the workstation in a number sort orders. For example, the profiles can be displayed in alphanumeric order by the operator identifier, in comfort area order, or by lighting area. The user profiles are stored by the workstation 28 on the storage device 24 of the IntraComfort system server 16. Once the Intracomfort system 10 has been configured, it can be placed into operation.

Figure 4A:
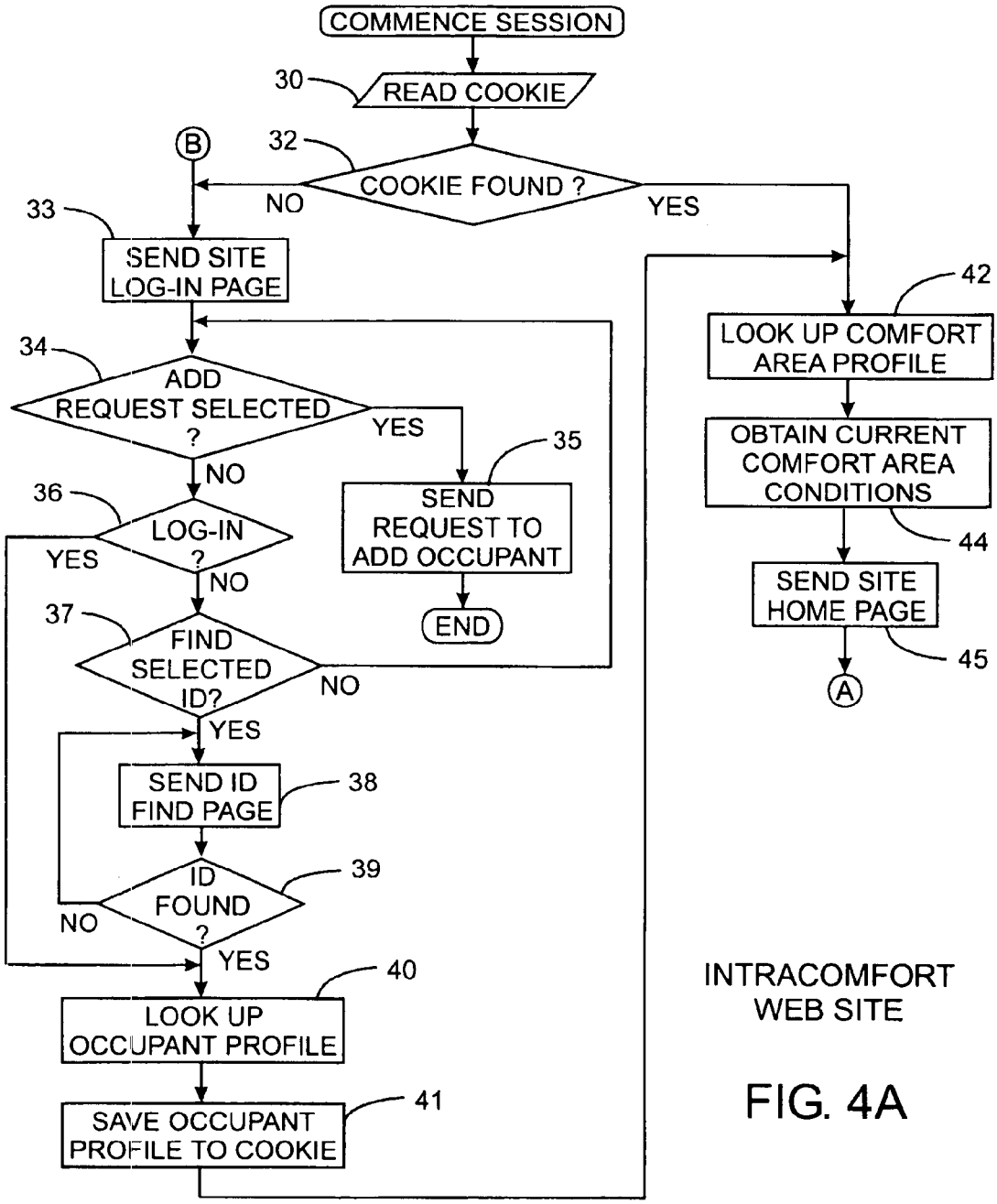
FIGS. 4A and 4B form a flowchart of the process performed by an Internet/Intranet web site through which building occupants interface with the IntraComfort system.

With reference to FIGS. 1 and 4A, when a particular occupant logs onto the Intracomfort web site 11, the web server 16 attempts to read a "cookie" from the web browser of the occupant's personal computer 26 at step 30. Web site commonly store cookies into the accessing personal computer and the cookies contain information useful to the web site on subsequent visits by that user. In this case, the presence of a cookie in the computer indicates that the occupant previously visited the IntraComfort web site and most likely has a profile stored in the system. Therefore, if a cookie is not found at step 32, the process branches to step 33 at which the Intracomfort web site 11 sends the occupant's personal computer a page that contains a form by which the occupant can log into the system, request to be added as a user, or query the system to find a previously assigned log-in identifier. The occupant fills out the form and returns the data to the Intracomfort web site 11.

At step 34 the Intracomfort web site 11 inspects the data to determine whether the occupant is requesting to be added as a new occupant. If so the procedure branches to step 35 at which the request and other form data is sent in a message to the building operator workstation via the complaint agent 12. The building operator responds to such requests from occupants seeking the be added as a system user by entering the supplied data into the occupant profile database in storage device 24.

If a request to add a new occupant was not received, the procedure branches to step 36 where web site 11 determines whether the occupant has submitted log-in information. If that is the case and the log-in information is authentic, the processing jumps to step 40. If an authentic log-in was not received, the web site 11 determines at step 37 whether the person accessing the web site seeks to locate an occupant identifier that was previously stored in a table in storage device 24. If so, the person is sent a web page requesting information that enables the system to find the log-in information at step 38. If that user submitted information does not allow the system to find the log-in information in the storage device 24, the process. return to step 38 to request more information.

Once the occupant has been properly identified to the Intracomfort web site 11, the associated occupant profile is read from the storage device 24 at step 40 and saved as a cookie on the person's personal computer 26 at step 41. The process then advances to step 42.

Thereafter when this person accesses the Intracomfort web site 11, a cookie containing the occupant profile will be read from the personal computer for that person. Therefore, the process will branch from step 32 immediately to step 42. That occupant profile from the cookie identifies the comfort area associated with the accessing occupant and enables the configuration data for that comfort area to be read from a database in storage device 24. The web site 11 then utilizes the building control system server 20 at step 44 to contact the building control system 22 and obtain information regarding the current conditions of the comfort area.

Figure 2:
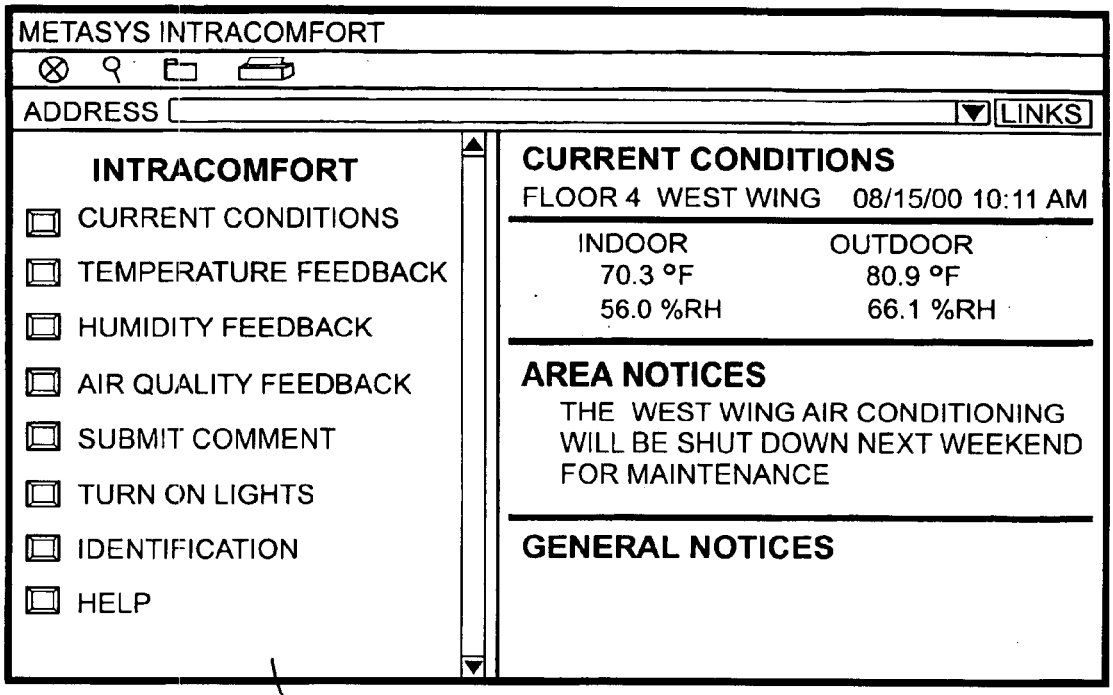
FIGS. 2 and 3 depict displays on a screen of a computer workstation which interfaces with the IntraComfort system.

The gathered information then is used to fill in the IntraComfort web site homepage at step 45. FIG. 2 depicts an exemplary web site's homepage in which the comfort area and its current environment conditions are indicated in the upper right section. Additional sections along the right of the homepage contain general building and area specific comments that the building operator has loaded into the Intracomfort web site 11 as messages for the occupants.

A web page frame 29 along the left side of the homepage provides a menu of items from which the occupant may select. The button labeled "Current Conditions" causes the display of the environmental data to be refreshed. Other menu items identify an environmental condition about which the occupant desires to provide feedback to the building operator. By clicking a button to the left of a particular menu item the occupant can select an item.

Figure 3:
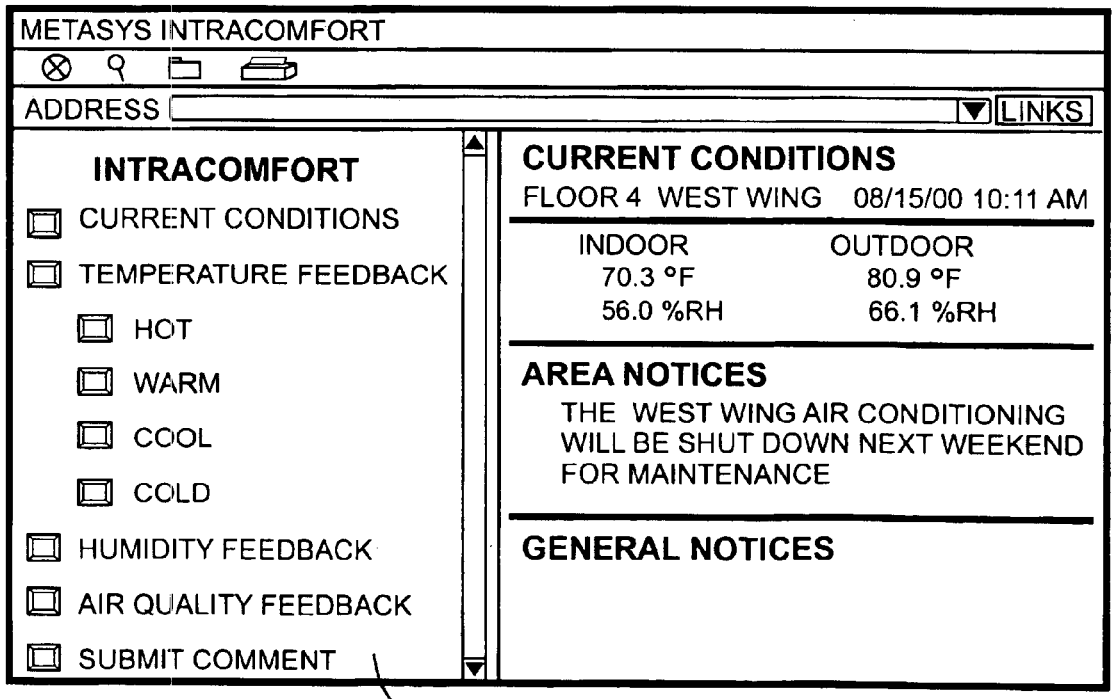

Depending upon which item is selected, the menu in web page frame 29 expands vertically to provide additional information related to that selection. For example, FIG. 3 illustrates the screen for entering a complaint about the temperature within the comfort area. Specifically web page frame 29 has an expanded section under the heading "Temperature Feedback" with additional buttons on which the occupant may click to indicate the nature and intensity of the temperature discomfort from among the selections of hot, warm, cool, or cold. Alternatively, the user can scroll downward through web page frame 29 on the page (FIG. 2) to enter a complaint on other environmental conditions, such as humidity or air quality, as well as to submit a written comment. Other menu items enable the occupant to turn on lights in the work area or preform other functions of the Intracomfort System 10. After the occupant makes a menu selection, the personal computer 26 transmits a message with the selected information to the system server 16 at step 45.

Figure 4B:
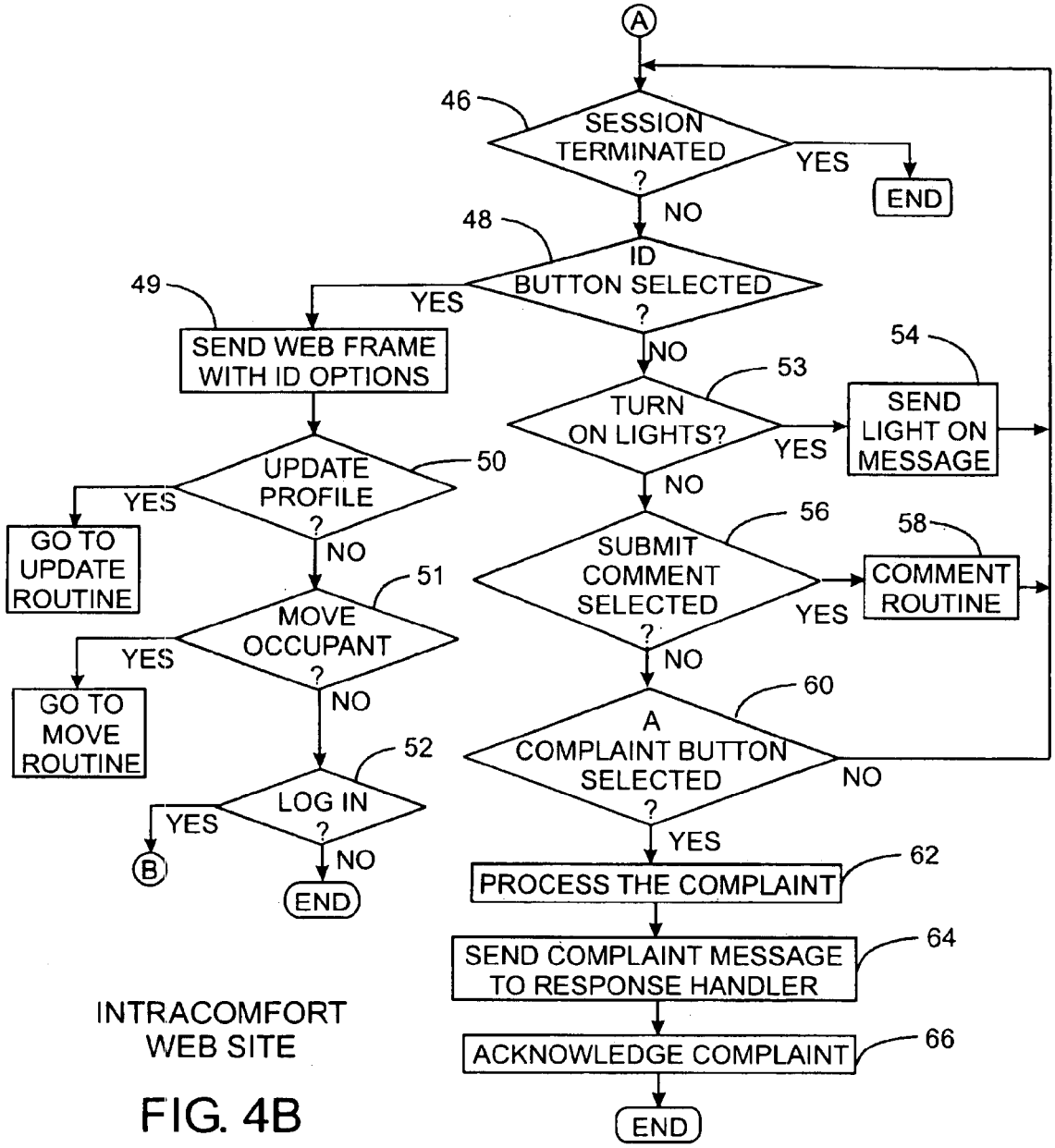

When the IntraComfort Site 11. receives the response from the occupant, a determination is made which menu item was selected. With reference to FIG. 4B, a determination is made at step 46 whether the user terminated the session in which event the communication with the occupant's computer ends. Otherwise the process advances to step 48 to determine whether the user selected the Identification menu item. If that is the case, the procedure goes to step 49 where the IntraComfort web site 11 sends a new web page frame 29 to the personal computer 26 which contains sub-items under the Identification heading. Those sub-items enable the occupants to update their profiles, indicate that they have moved within the building, or manually log-in as described previously.

When the response information to the new menu frame 29 is sent back from the personal computer 26, the Intracomfort web site 11 determines at step 59 whether the occupant desires to update his profile. In that case the process branches to the update routine. Other wise at step 51 a determination is made whether the occupant has wishes to indicate a building move so that the proper comfort area and lighting bank will be listed in the occupant profile. This is done by the building operator, who now is informed of the move. Finally at step 52, a decision is made whether the accessing occupant desires to manually log-in. After an occupant moves to an different area in the building, the cookie information in the personal computer no longer may be valid and the occupant may have to override the automatic log-in via the cookie with a manual log-in. In another situation, an occupant may use the personal computer of another occupant to enter a complaint. In this case, the initial log-in uses the profile of that other occupant that was obtained from the cookie in the computer. Thus the occupant accessing the system has to log-in manually so that his profile information will be used in registering the complaint.

Back at step 48 if the Identification menu item was not selected the processing advances to step 53. If the occupant's response to the Home Page at step 44 designated that the lights in the work area should be turned on, that event is detected at step 53 where the process branches to step 54. At this juncture, the Intracomfort web site 11 executes a routine which formulates a message which is sent to the response handler 70 to turn on the lights and an indication of the lighting group to be activated. That message is sent to the building control system server 20 (FIG. 1) which then communicates the information to the building control system 22 causing the latter component to activate the designated section of the building lighting.

At step 56 a determination is made by the Intracomfort web site 11 whether the occupant selected the button. designated for entering a written comment. If so the user input web page for a comment is sent to the occupant's personal computer at step 58. Upon receipt, Intracomfort web site 11 forwards the comment to the response handler 58 which logs the information into a storage location of device 24. The building operator is able to access this log via the workstation 28 and read the comments stored therein.

If one of the complaint buttons associated with an environmental condition was selected as determined at step 60, the process advances to step 62 where the Web site interprets the complaint data and formulates a message containing the complaint. That message specifies the occupant's identifier, the associated comfort area and the complaint, for example that the temperature is too hot. Alternatively, the complaint could indicate that the humidity in the area was too dry or too humid, or that the air quality was stuffy, stale, drafty, dusty or there was an unusual odor. At step 64, this message is sent by the Intracomfort web site 11 to the Complaint Agent 12 and, specifically, to the response handler 70. An acknowledgment of the complaint receipt is sent back to the originating personal computer at step 66.

Figure 5:
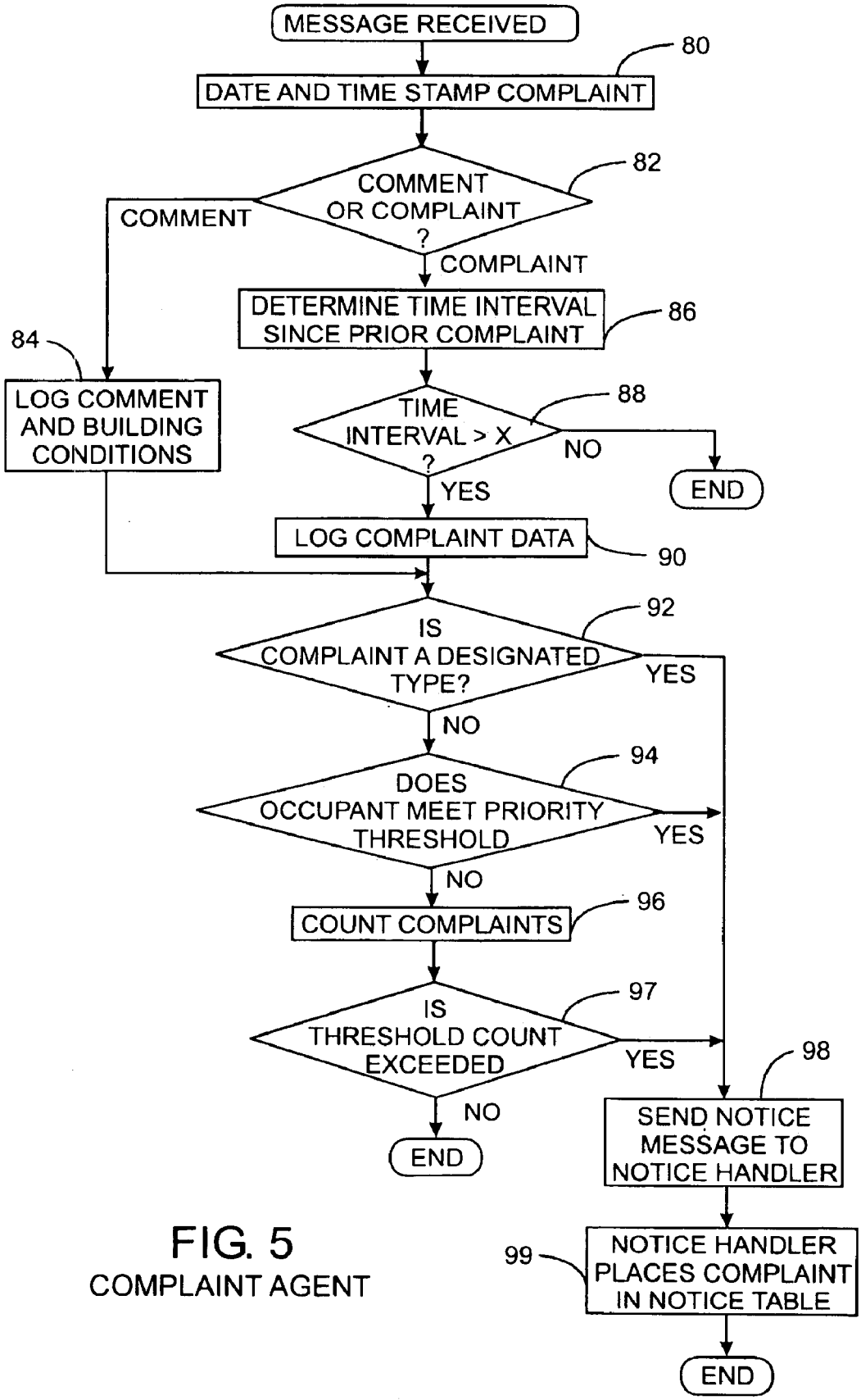
FIG. 5 is a flowchart of a complaint processing method performed by software which receives a occupant supplied information from the Internet/Intranet web site.

With reference to FIG. 5, when the response handler 70 receives a message from the Intracomfort web site 11, the message is date and time-stamped at step 80. Then a determination is made at step 82 whether the message contains a comment or a complaint. When a comment is received, it is logged into a comment table in the storage device along with the current environmental conditions of the associated comfort area at step 84. When a complaint is received, the response handler 70 examines the message by extracting the occupant's identifier at step 86 which then is used to access a complaint log within storage device 24 to determine the last time that this occupant submitted a complaint. The response handler 70 implements a temporal filter which prevents a given occupant from repeatedly submitting complaints within a relatively short interval of time. This filtering not only prevents a person from becoming a nuisance but also permits the HVAC system to respond to the complaint before the individual can submit a similar complaint. The building operator performs a variety of functions and is not continuously monitoring for complaints. Even once the operator adjusts the building control system 22 in response to a complaint, the HVAC system cannot change the environment instantaneously. For example it may take thirty minutes or more for the HVAC to produce a change in the temperature after receiving a command, depending upon the magnitude of the change and the size of the comfort area. Therefore at step 86, the IntraComfort system determines whether a predefined interval of time, designated X, has elapsed since the previous complaint from this occupant. If that is not the case, a wait indication is returned to the web page denoting to the occupant that a complaint can not be submitted until the interval expires. Comments are entered into the system database without checking the interval.

If the user has not sent a complaint recently, the process implemented by the response handler 70 advances to step 90 at which the response handler 70 formulates a log entry for the complaint and stores that information in a complaint log contained on storage device 24. As will be described, the building operator via the workstation 28 is able to access this log and scroll through the complaints listed therein.

Then the response handler assesses whether the present complaint warrants sending a special notice to the building operator workstation 28. The determination of whether the complaint is significant is based on criteria specified during configuration of the IntraComfort System 10 and alterable thereafter by the building operator via workstation 28. In the preferred embodiment, there are three different criteria from which the building operator may select and any combination of one or more criteria may be active in a particular system.

The first criterion specifies either that all complaints or specifically designated types of complaints will generate a notice to the operator. For example, the operator may want to be notified immediately of all temperature and air quality complaints, but not for other complaints. The second criterion produces notices from complaints submitted by an occupant who has been assigned a priority level equal to or greater than a designated value. For example, department managers and higher supervisory personnel may be assigned priority levels of 50 or higher and complaints from those persons will generate a building operator notice. Complaints received from personnel with lower priority levels merely will be placed in the complaint log. This priority criterion also can be utilized to generate notices from facility management personnel and security officers. The third criterion generates notices when the number of specific types of complaints from a comfort area exceeds a given number within a moving window of time. For example, a notice will be sent to the building operator when the number of complaints that an area is too cold exceeds five within in a moving one hour period of time. Configuration data specifying which of the three criteria are active and the complaint filtering requirements for each criterion are stored within a data table utilized by complaint agent 12.

The assessment of whether receipt of the current complaint necessitates generation of an operator notice commences at step 92. Here, the complaint is examined to determine whether it fits within the first criterion, that is whether it is the designated complaint type. If all complaints are to generate a notice or the complaint fits within a specified category of complaints, the program execution branches to step 98. If the first criterion is not satisfied the program execution branches instead to step 94 for the second criterion. At this point, the occupant identifier in the complaint is utilized to access the occupant profile database in device 24 and read the priority level of the complainer. If the complainer meets the priority level threshold, the procedure branches to step 98, otherwise the process goes to step 96. The response handler 70 accesses the complaint log to count the complaints which satisfy the specified notice criteria, i.e. is the particular complaint type from the comfort area of the present complaint and received within the designated interval of time. Upon advancing to step 97 the new count value is compared to the respective operator defined threshold to ascertain whether the requisite number of complaints of that type have been received within the specified time interval. If that criterion is satisfied, a branch to step 98 occurs, otherwise the complaint handling process terminates.

At step 98, the response handler 70 formulates a message containing the type of notice to be presented to the building operator. This message is transmitted to the notice handler 72 within the complaint agent 12. The message contains all of the pertinent information which will allow the notice handler to prepare the proper notice to the building operator and log that information into a notice table in the database maintained in storage device 24. The Complaint Analyst 13 displays a table of notices to the building operator.

The building operator can acknowledge and delete specific notices on the workstation 28 by clicking on appropriate command buttons appearing in the complaint analyst. Acknowledging a complaint notice sends a reply message to the notice handler 72 which responds by setting an acknowledgment flag in the respective entry in the notice log. If the building operator deletes the complaint message, the corresponding entry in the notice log also is deleted by the notice handler 72.

With reference again to FIG. 1, the complaint analyst 13 running on the operator workstation 28 provides an interface to the system server 16 on which the Intracomfort web site 11 and the complaint agent 12 reside. This enables the building operator, via the workstation 28, to configure the functions of and supply other data to the Intracomfort System 10, in addition to receiving the notices posted by the complaint agent 12. The complaint analyst 13 also is employed to generate comfort reports and display complaint summaries via the operator workstation 28. In addition the complaint analyst provides feedback to the occupants by entering comfort area or building wide comments that are displayed on the web site.

Configuring the Intracomfort system server 16 and its constituents, such as the Intracomfort web site 11 and the complaint agent 12, is implemented using standard techniques. Specifically, a configuration screen is presented on the operator's workstation 28 for each element that needs to be configured. Such screens contain fields for the parameters which need to be defined and each field may have a pull down menu of entry choices. Alternatively, the operator is permitted to type in a particular entry. Control buttons are presented on the configuration screen to save, clear and perform other command functions which manipulate the configuration data.

The building operator also utilizes the complaint analyst 13 to view and maintain all occupant submitted complaints, comments and requests along with the notices that are produced by the notice handler 72. Principal to the complaint analyst 13 are interactive views of comfort complaints and notices in a grid-based format, in addition to reports of the comfort information in tabular and graphical formats. The interactive representations allow the operator to acknowledge complaints that have been serviced, enter service comments, delete complaints and notices from their respective logs, and look up occupant information relevant to a resubmitted complaint.

The comfort reports display a collective or a subset view of comfort complaints, notices or comments. The report generation is similar to that conventionally used in databases to allow the user the ability to formulate a query specifying value ranges for the data being sought and then utilize those specified ranges to select entries from the databases and logs contained in storage device 24. The culled information then is presented to the user in a predefined report format. The operator is able to design and store various formats to use in generating periodic reports from the Intracomfort System 10.

Figure 6:
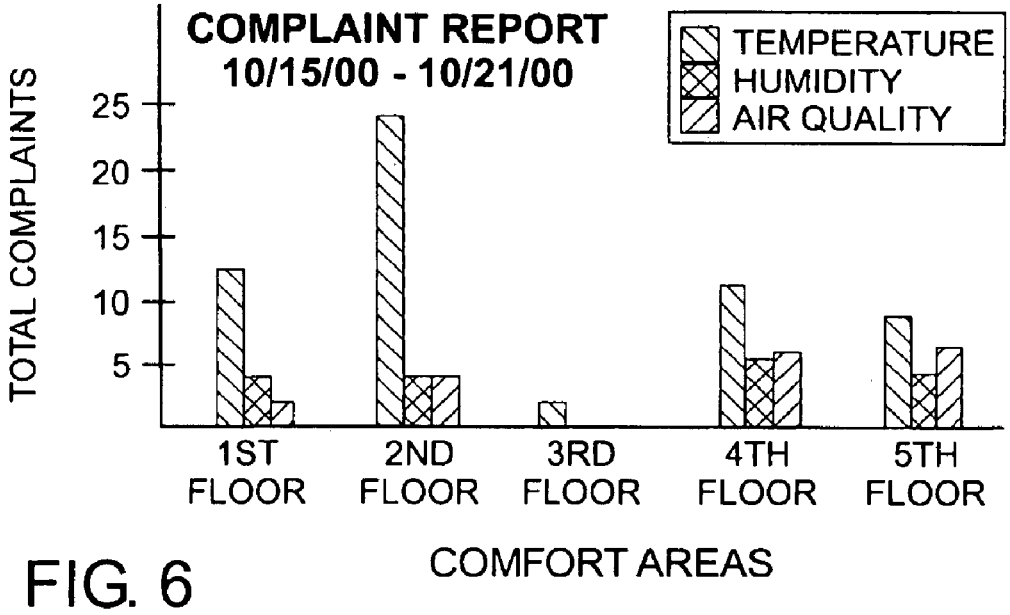
FIGS. 6 and 7 show exemplary graphical reports which tabulate complaints received by the system.
Figure 7:
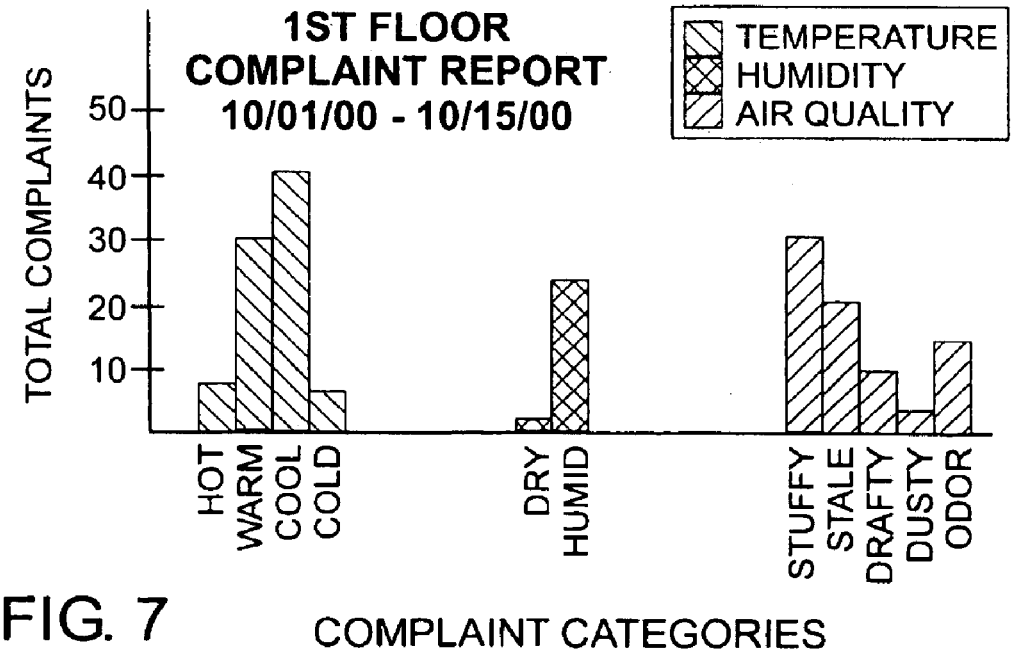

For example, FIGS. 6 and 7 illustrate a pair of bar graphs which can be created to display complaint information. Specifically, FIG. 6 shows the number of complaints related to temperature, humidity and air quality conditions that were received for each comfort area. In this exemplary display, the second floor has a higher than average number of complaints with respect to temperature. FIG. 7 illustrates the complaint volume for one comfort area and the number of each type of complaint within each environmental condition. These types of bar graphs enable the building management to easily perceive an overview of the complaint generation and ascertain problem areas that may exist.

FIG. 8 depicts the display of the complaint log on the operator workstation and also corresponds to the format of the data structure used to store the log of complaint information in the storage device 24.

What is claimed is:

1. In a management system, an apparatus by which an occupant of a building submits a complaint regarding an environmental condition of the building, said apparatus comprising:

a communication network which is accessible by the occupant to transmit complaint messages, wherein the complaint messages are configured to include information regarding an environmental condition of the building;

a message processing system coupled to the communication network to receive the complaint messages, the message processing system containing a predefined message filtering criterion which is applied to received complaint messages and generating a warning when the received complaint messages satisfy the predefined message filtering criterion; and a display device coupled to the message processing system and presenting the warning a management of the building.

2. The apparatus as recited in claim 1 wherein the predefined message filtering criterion specifies a given number of complaint messages which must be received in order for a warning to be generated.

3. The apparatus as recited in claim 1 wherein the predefined message filtering criterion specifies a given number of complaint messages which must be received within a defined interval of time in order for a warning to be generated.

4. The apparatus as recited in claim 1 wherein the predefined message filtering criterion specifies an occupant characteristic, and the warning is generated upon receipt of a complaint message from occupants possessing that characteristic.

5. The apparatus as recited in claim 1 wherein the predefined message filtering criterion specifies a class of occupants, and the warning is generated upon receipt of a complaint message from an occupant in that class.

6. The apparatus as recited in claim 1 wherein the predefined message filtering criterion specifies a given area of the building and the warning is generated upon receipt of a complaint message from that area.

7. The apparatus as recited in claim 1 wherein the message processing system inhibits generation of a warning when a plurality of complain messages are received from a single occupant within a predefined interval of time.

8. The apparatus as recited in claim 1 wherein the message processing system further comprises a storage device which retains information related to the received complaint messages.

9. The apparatus as recited in claim 8 wherein the display device also presents the information related to the received complaint messages that has been stored in the storage device.

10. The apparatus as recited in claim 1 wherein the message processing system comprises a server which forms an Intranet site on the communication network.

11. In a management system for a building that has a communication network which is accessible by occupants of the building, an apparatus by which the occupants submit complaints regarding an operating condition of the building, said apparatus comprising:

a storage device containing a log for complaints received from the occupants, wherein the complaints are configured to include information regarding an operating condition of the building;

a web site connected to the communication network and to the storage device, wherein upon being contacted by an occupant the web site replies with a web page for submitting a complaint regarding an operating condition of the building, the web site also receives complaint messages from such an occupant via the communication network;

a complaint agent connected to the web site to receive complaint messages therefrom and connected to the storage device, the complaint agent storing received complaint messages into the log in the storage device; and a workstation coupled to the storage device to obtain and present information from the log to building management personnel; wherein the complaint agent applies a filtering criterion to received complaint messages and generates a warning when the received complaint messages satisfy the filtering criterion; and the workstation presents the warning to building management personnel.

12. The apparatus as recited in claim 11 wherein the workstation comprises a complaint analyst which processes data received from the complaint agent and the storage device and formulates displays of that data for presentation to the building management personnel.

13. The apparatus as recited in claim 11 wherein the complaint message also contains information that for each occupant identifies an area of the building and the web site associates each complaint message received with the area of the building identified for the occupant who sent the complaint message.

14. The apparatus as recited in claim 11 wherein the complaint agent logs environmental conditions with the complaint.

15. The apparatus as recited in claim 11 wherein the web site customizes the web page according to an area of the building identified for an occupant who contacted the web site.

16. The apparatus as recited in claim 15 wherein the web site customizes the web page with specific operating conditions defined for the area of the building identified for the occupant who contacted the web site.

17. The apparatus as recited in claim 11 wherein the complaint agent inhibits generation of a warning when a plurality of complaint messages are received from a single occupant within a predefined interval of time.

18. The apparatus as recited in claim 11 wherein the complaint agent generates a warning in response to a given number of complaint messages being received.

19. The apparatus as recited in claim 11 wherein the complaint agent generates a warning in response to a given number of complaint messages being received within a defined period of time.

20. The apparatus as recited in claim 11 wherein the complaint agent contains a message filtering criterion which specifies an occupant characteristic and the complaint agent generates a warning upon receipt of a complaint message from occupants possessing that characteristic.

21. The apparatus as recited in claim 11 wherein the complaint agent generates a warning in response to receipt of a complaint message from a predefined area of the building.

22. In a management system, an apparatus by which occupants of a building submit complaints regarding an operating condition of the building, the building having a communication network which is accessible by the occupants, said apparatus comprising:

a storage device containing a log of complaints received from the occupants, wherein the complaint messages are configured to include information regarding an environmental condition of the building;

a web site connected to the communication network and to the storage device, wherein upon being contacted by an occupant the web site replies with a web page for submitting a complaint regarding an operating condition of the building, the web site also receives complaint messages from the occupant;

a complaint agent connected to the web site to receive complaint messages therefrom and connected to the storage device, the complaint agent storing received complaint messages into the log in the storage device and further applying a filtering criterion to the received complaint messages and generating a warning when the received complaint messages satisfy the filtering criterion; and a workstation coupled to the complaint agent to receive and present the warning to building management personnel.

23. The apparatus as recited in claim 22 wherein the workstation presents building management personnel with information that was stored in the log in the storage device.

24. The apparatus as recited in claim 22 wherein the filtering criterion applied by the complaint agent inhibits a plurality of complaint messages sent by one occupant within a given interval of time from causing generation of a warning.

25. The apparatus as recited in claim 22 wherein the complaint agent logs environmental conditions with the complaint.

26. The apparatus as recited in claim 1, wherein the management system is a facility management system, further comprising a building control system server coupled to the communication network to obtain information related to the complaint messages regarding the environmental condition of the building from the facility management system.

27. The apparatus as recited in claim 26, further including a storage device that retains information related to the complaint messages regarding the environmental condition of the building obtained from the building control system.

28. The apparatus as recited in claim 14, wherein the management system is a facility management system, further comprising a building control system server coupled to the communication network to obtain the environmental conditions from the facility management system.

29. The apparatus as recited in claim 25, wherein the management system is a facility management system, further comprising a building control system server coupled to the communication network to obtain the environmental conditions from the facility management system.

30. A method of processing complaint messages, the method comprising:

receiving the complaint messages in a message processing system, wherein the complaint messages are configured to include information regarding an environmental condition of a building, and wherein the complaint messages are received from a communication network which is accessible by occupants of the building;

filtering the complaint messages according to a predefined message filtering criterion;

generating a warning when the received complaint messages satisfy the predefined message filtering criterion; and presenting the warning to management of the building.

31. The method of claim 30, wherein the predefined message filtering criterion specifies a given number of complaint messages which must be received within a defined interval of time in order for the warning to be generated.

32. The method of claim 30, wherein the predefined message filtering criterion specifies an occupant characteristic, and the warning is generated upon receipt of a complaint message from occupants possessing that characteristic.

33. The method of claim 30, wherein the predefined message filtering criterion specifies a class of occupants, and the warning is generated upon receipt of a complaint message from an occupant in that class.

34. The method of claim 30, wherein the predefined message filtering criterion specifies a given area of the building and the warning is generated upon receipt of a complaint message from that area.

35. The method of claim 30, wherein the message processing system is configured to inhibit generation of the warning when a plurality of complaint messages are received from a single occupant within a predefined interval of time.

36. The method of claim 30, wherein the message processing system comprises a server which forms an Internet site on the communication network.

37. The method of claim 30, further comprising obtaining information related to the complaint messages from a building control system server coupled to the communication network.

38. The method of claim 37, further comprising storing with the complaint messages the information related to the complaint messages.

39. the method of claim 38, wherein the information related to the complaint messages includes a measured environmental condition of the building.

* * * * *